United States Patent Office 3,751,542
Patented Aug. 7, 1973

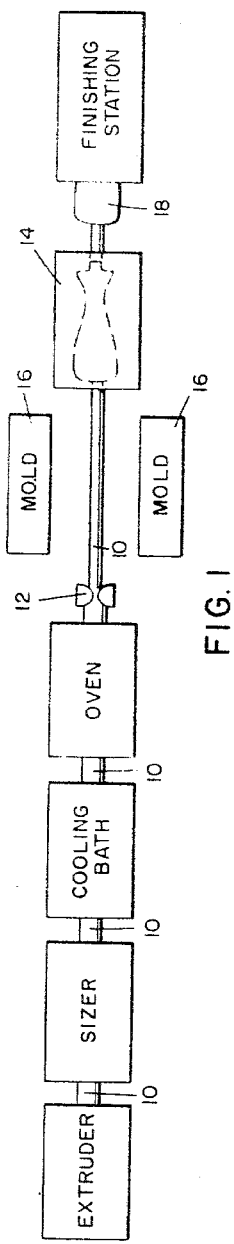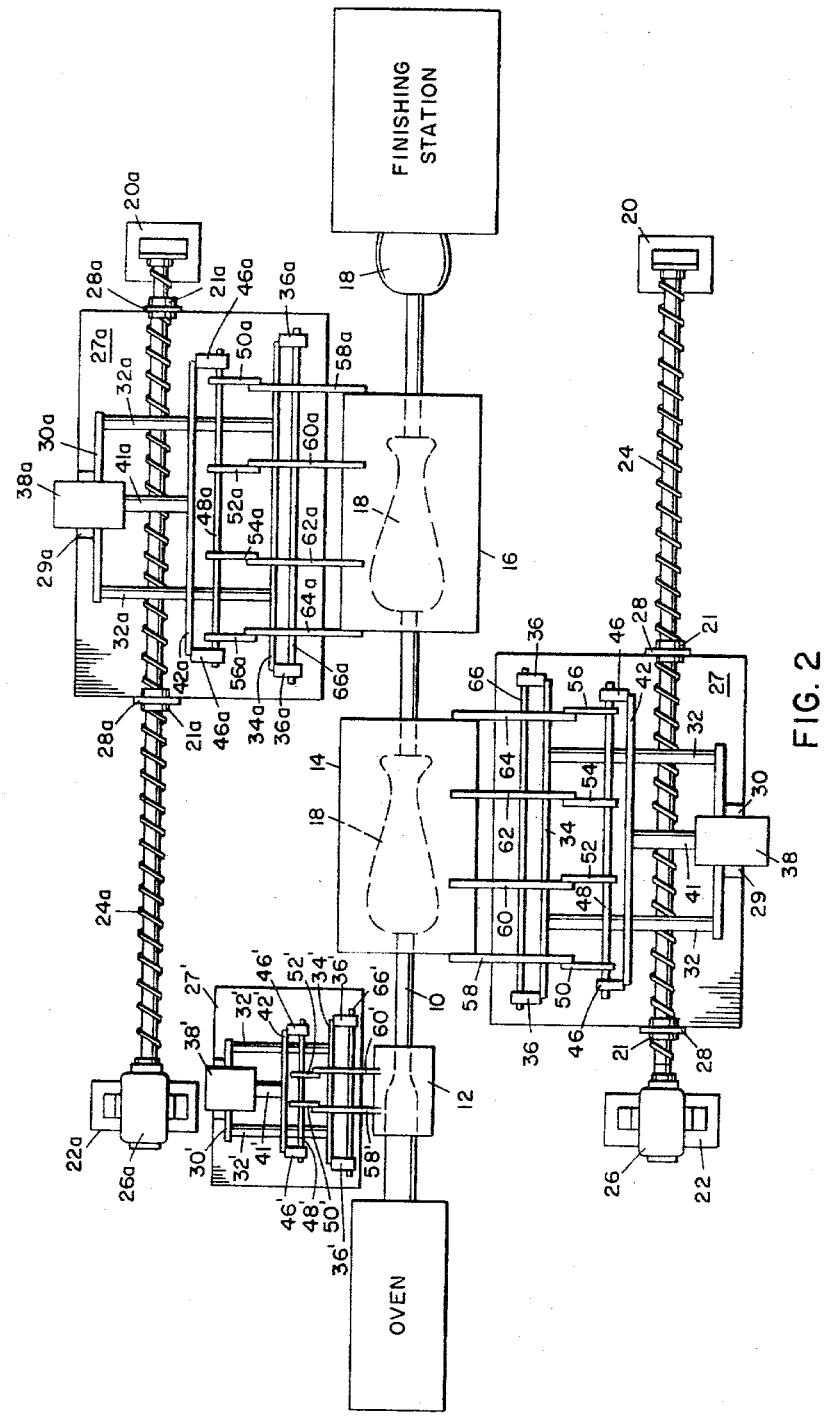

3,751,542
ORIENTATION OF TUBING FOR A CONTINUOUS PROCESS FOR MAKING BLOW MOLDED CONTAINERS
John N. Hall, Newark, Del., assignor to Hercules Incorporated, Wilmington, Del.
Filed Nov. 9, 1971, Ser. No. 197,060
Int. Cl. B29c 17/07
U.S. Cl. 264—99                    1 Claim

ABSTRACT OF THE DISCLOSURE

The time lapse between initiation of orientation of a continuous plastic tubing and blowing a container therefrom in a continuous process for making blow molded containers is reduced by having one mold moving away from an oven to draw a given length of tubing from the oven and then clamping the tubing at a location adjacent the oven and letting continued movement of the mold away from the oven orient the given length of tubing. Another mold closes on the oriented length of tubing and a container is formed therein.

---

This invention concerns a continuous process for making oriented containers comprising thermoplastic polypolymers, including amorphous polymers such as polyvinyl chloride, polystyrene and polymethacrylate and copolymers and terpolymers in which styrene, acrylate esters and methacrylate esters are monomeric components, and crystalline polymers such as polymers of mono-α-olefins containing up to 6 carbon atoms, polyesters, polyamides, polyacetals, polycarbonates and polyethers. Mixtures of polymers or polymers in adjoining separate layers may also be used. Isotactic polypropylene is particularly applicable in this process.

In blow molding of containers from an oriented tubing, it is very important to form the container as soon as possible after the start of stretching or orienting a section of the tubing from which the container is formed in order to provide a container of maximum uniformity and quality.

It is thus an object of this invention to improve upon prior art continuous blow molding processes by shortening the time lapse from the start of orienting a tubular section to actual forming of a container from such section.

Figure 3:
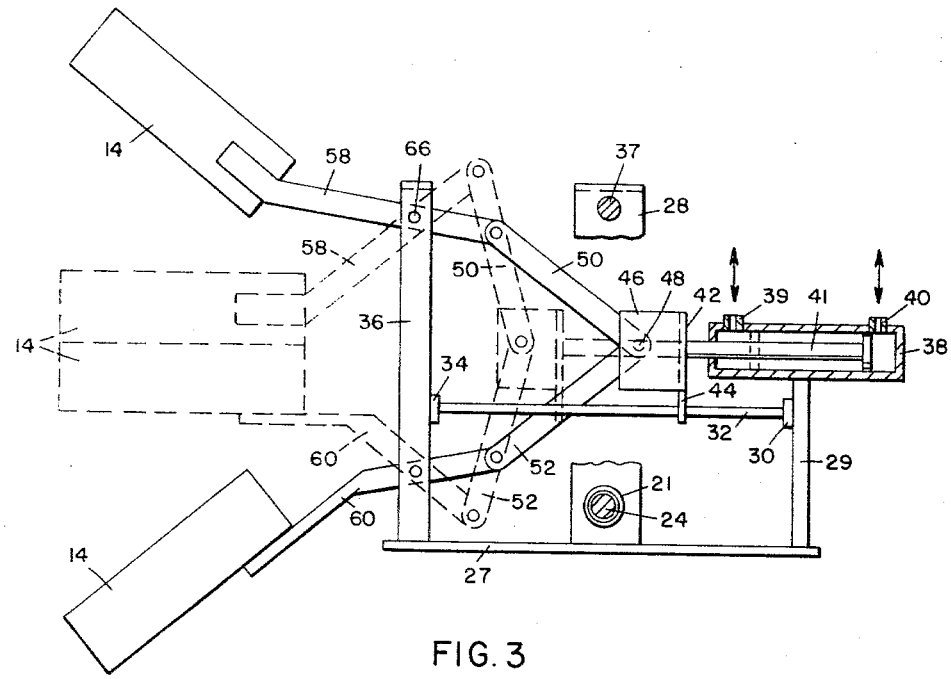
Figure 4:
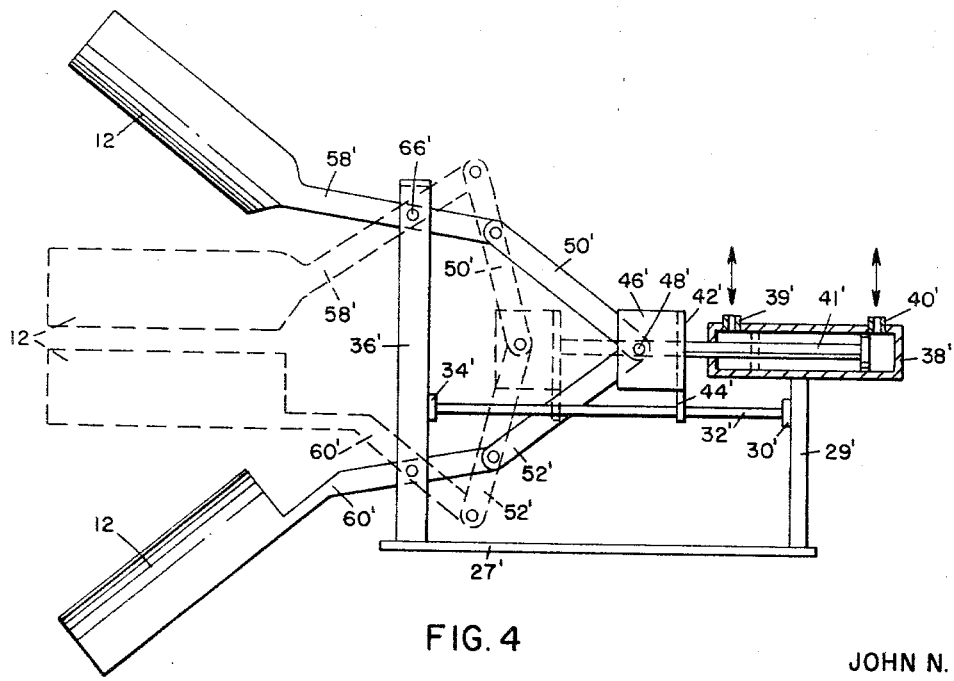
Figure 5:
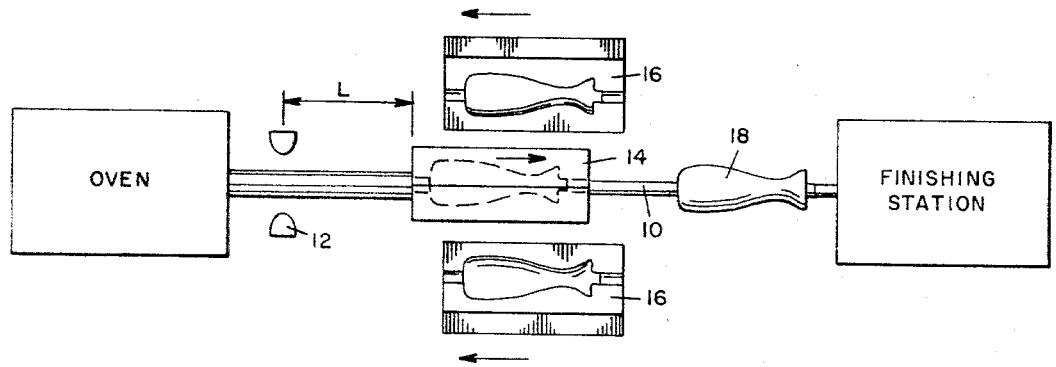
Figure 6:
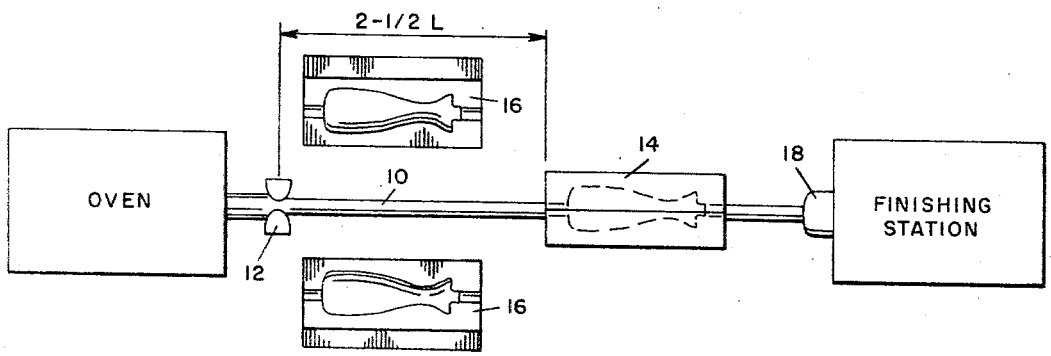
Figure 7:
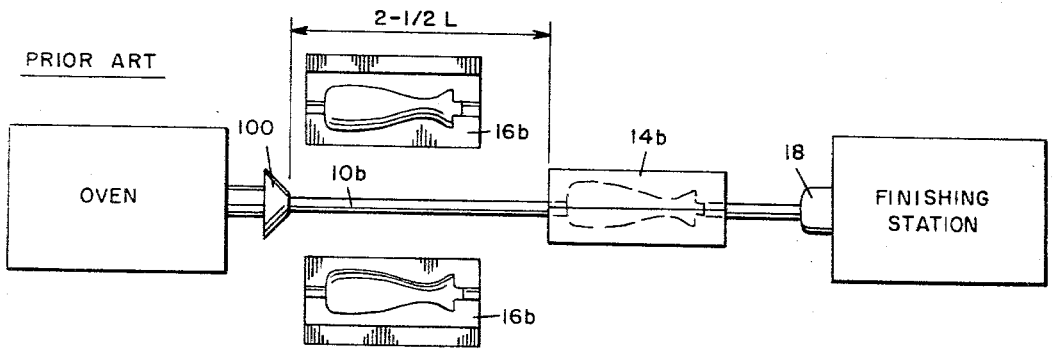

Other objects of this invention will become apparent from the following description with reference to the drawings wherein:

FIG. 1 is a flow diagram of the process of the invention;
FIG. 2 is a plan view of a pair of molds and the apparatus for operating the same;
FIG. 3 is an end view of one of the molds and the actuating mechanism therefor;
FIG. 4 is an end view of tube retainer members and the actuating mechanism therefor;
FIG. 5 is a view of the relative positions of the molds, tube retainer, and tubing just prior to the retainer being closed on the tubing;
FIG. 6 is a view of the relative position of the molds, tubing, and tube retainer immediately after a section of the tubing is oriented and a mold is about to close thereon; and
FIG. 7 is a view in a prior art process of the relative positions of the molds and tubing immediately after a section of the tubing is oriented and a mold is about to close thereon.

Referring to the flow diagram of FIG. 1, an extruder is utilized to extrude a tube 10 preferably made of polypropylene. The tube passes through a sizer and then a cooling bath where the tube is cooled below the crystalline temperature. In the case of polypropylene, the tube is cooled to about 120° F. to hasten crystallization. The tube 10 is drawn from the extruder through the sizer and cooling bath by a driven set of opposed tires (not shown). The tube 10 is reheated in an oven to a few degrees below the crystalline melting point (about 140° C.–167° C.) and after being reheated, passes between a pair of retainer members 12 to molds 14 and 16 which alternatively grip the tube 10 and move away from the oven to stretch the same to orient the tube when the retainer is closed to hold the tube. Each of the molds is communicated with a source of pressure which is utilized to expand the tube inside the mold to form a container 18. The container 18 proceeds to a finishing station where it is separated from the other containers and the flash removed.

Referring to FIGS. 2 and 3, support members 20 and 22 are provided with each support 20 receiving one end of a rotatable threaded shaft 24 and each support 22 having a reversible motor 26 fixed thereto receiving the other end of the threaded shaft 24. A longitudinally movable mold carriage is provided and comprises a platform 27, a pair of longitudinally spaced plates 28 fixed to the platform 27, each having an internally threaded bushing 21 receiving the shaft 24 therethrough, plate 29 fixed to the platform 27, a bar 30 secured to the plate 29, and guide bars 32 which are secured to bar 34 which is in turn secured to a pair of longitudinally spaced plates 36. A carriage guide bar 37 extends parallel to and above the threaded shaft 24 and is fixed to the supports 20 and 22. The bar 37 is not shown in FIG. 2 in the interest of maintaining clarity. As shown in FIG. 3, the bar 37 passes through supports 28 to slidably guide the carriage structure. A hydraulic cylinder 38 having ports 39 and 40 is secured to the plate 29 and has a piston rod 41 slidable therein. Attached to the piston rod 41 is a slidable plate 42 secured thereto which has openings 44 through which the bars 32 extend for slidably guiding the plate 42. Flanges 46 are secured on each end of the plate 42 and a shaft 48 is secured to the flanges 46. A plurality of links 50, 52, 54, and 56 are pivotally mounted at one end of the shaft 48 and pivotally secured at the other end to lever arms 58, 60, 62 and 64, respectively. The lever arms are pivotally connected intermediate the ends thereof to a stationary shaft 66 secured to the plates 36. The other end of levers 60 and 62 are secured to the upper half of the mold and the other end of levers 58 and 64 are secured to the lower half of the mold for opening and closing the same.

The mold is closed from the open position illustrated in FIG. 3, by introducing pressure into cylinder 30 through port 40 thereby moving the piston rod 41 forward to slide the plate 42 on guide bars 32 forward as well as the link pivot shaft 48. Forward movement of the pivot shaft 48 pivots the links 50, 52, 54, and 56 in a clockwise direction about their pivotal connections with the respective lever arms which in turn causes the lever arms 58, 60, 62, and 64 to pivot counterclockwise about the shaft 66 to close the mold as shown in phantom in FIG. 3. Introduction of pressure into port 39 of the cylinder 30 causes the piston rod 41 to move in the opposite direction causing the links and levers to move from the phantom position to the mold open position shown in full in FIG. 3. The mold is moved in a longitudinal direction away or towards the oven by actuating the motor 26 to rotate the threaded shaft 24 through the threaded connection thereof with the bushing 21 forcing the whole mold carriage structure to slide along guide shaft 37 either away from or towards the oven depending upon the direction of rotation of its respective shaft. The description for the actuating mechanism for the mold 16 is the same as that for mold 14 with the reference numerals therefor being the same only with an "a" affixed thereto.

Referring to FIG. 4, the actuating mechanism for opening and closing the retainer members 12 is the same as that for the molds 14 and 16 with the reference numerals therefor being the same only with a prime (') affixed thereto. In this structure, the support 27' is stationary rather than a movable one as disclosed for the molds.

The system for introducing air pressure into the molds, opening and closing the molds, opening and closing the retainer members, and operating the threaded shafts for moving the molds, all in proper sequence, comprises limit switches, air-brake contactors, solenoid valves and timers all of which are well known and do not form any part of this invention.

In operation, FIG. 2 illustrates the molds both in closed position with a bottle 18 being formed in mold 16 which is ready to be opened. The mold 14 has just closed about a length of tubing and a bottle 18 has been formed therein by communication of air pressure into the tube through a blow pin (not shown) located in the mold and penetrating the tubing. The cylinder 38a is actuated to open mold 16 and the motor 26 is rotating shaft 24 in a counterclockwise direction to move mold 14 forward away from the oven at a faster rate than the tubing 10 is being fed into the oven. At this point in the process, the retainer members 12 are open and the mold 14 grips the tube 10 to pull the same a distance "L" (FIG. 5). The rate that the mold is moved away from the oven is such that the elastic limit of the tubing is not exceeded. The mold is able to move faster than the tubing is fed into the oven and not exceed the elastic limit of the tubing since the stretching that will occur will be distributed over a large length of tubing in the oven resulting in an elastic stretch rather than orientation. For instance, the tubing may be fed into the oven at the rate of 4 feet per minute and the mold may be moving at 10 feet per minute resulting in a stretch of 3.36 inches for a mold movement of 5.6 inches (L) while the tube retainer members 12 are open. This stretch will be distributed over about a 30 foot length of tubing in the oven resulting in a stretch of about .009 in./inch or 0.9%. After the tubing has been pulled a distance "L," the pistion rod 41' is actuated to close members 12 on the tubing 10 to retain the tubing. Continued movement of the mold 14 stretches the length "L" of the tubing beyond its elastic limit to about 2½ times its original length in the longitudinal direction (see FIG. 6) thereby orienting the same. The additional tubing that is being fed into the oven while the retainer members are closed is taken up by the elastic memory of the tubing in the oven which was previously stretched by movement of the mold 14 whereby the tubing in the oven remains in a fairly taut condition throughout the process. As the mold 14 moves forward, motor 26a is actuated to rotate the shaft 24a in a clockwise direction to move the mold 16 back toward the oven where it takes a position adjacent the length "2½ L" or oriented tubing as shown in FIG. 6. At this position the motor 26a is stopped, reversed to rotate the shaft 24a counterclockwise to move the mold 16 away from the oven and then cylinder 38a is actuated to close the mold on the tubing to form another bottle. The cylinder 38' is then actuated to open the retainer members 12 and the cylinder 38 is actuated to open the mold 14 and then motor 26 is reversed to rotate the shaft 24 in a clockwise direction to return the mold 14 toward the oven to again repeat the same cycle. The bottle from mold 14 then passes to the finishing station.

It is to be noted that the time lapse from initiating orientation to completion of orientation is the time required for the molds to travel a distance of about "1½L." In referring to FIG. 7, a prior art process is shown with the elements in the same positions as in FIG. 6. Those elements which are the same as in FIG. 6 have been given the same reference numeral only with a "b" affixed thereto. A restrictor cone 100 is located between the oven and the molds. Orientation of the tubing 10 is effected by pulling the tubing through the restrictor cone by the mold 14b. Thus, orientation of the tubing is initiated when mold 14b is first closed on the tubing and begins to move away from the oven which means that the time lapse from initiating orientation to completion of orientation is the time required for the molds to travel a distance "2½L." When the tube is stretched or oriented to a length 4 times the original length, the mold will be orienting the tube for a time period required for the mold to move 3L for the instant invention while the mold will be orienting the tube for a time period required for the mold to move 4L for the prior art process shown in FIG. 7. Thus at the same mold speeds, the time lapse for initiation of orientation of the tube to actual blowing thereof is in a range from approximately 1½L/2½L or 60% to 3L/4L or 75% of the process of the prior art disclosed in FIG. 7.

What I claim and desire to protect by Letters Patent is:

1. In a process for blow molding a container from a continuously moving unitary tube of synthetic thermoplastic polymer including the steps of providing a continuous tube of the desired thermoplastic polymer, passing the tube through heating means to heat the tube to its orientation temperature, closing a first mold about said tube after it emerges from said heating means, applying fluid pressure within the tube portion inside said first mold to expand the same to the contour thereof, moving said first mold away from said heating means, then closing a second mold about the portion of the tube between said heating means and said first mold, applying fluid pressure within the tube portion inside said second mold to expand the same to the contour thereof, then moving said second mold away from said heating means and then closing said first mold about the portion of tubing between said heating means and said second mold in a continuous operation, the improvement comprising:
    (a) moving said first and second molds away from said heating means faster than the speed of the tube being passed into said heating means to elastically stretch the portion of the tubing in said heating means, and then,
    (b) clamping said tubing at a point after said first or second mold, respectively, has moved a predetermined distance from said heating means while continuing movement of the molds, such further movement of said molds stretching and orienting the portion of the tubing between said mold and said portion of clamping, said clamping causing the portion of tubing in the oven which has been elastically stretched to be relaxed by the retarding of movement of said tubing.

References Cited
UNITED STATES PATENTS 3,311,684   3/1967   Heider _____ 264—99

ROBERT F. WHITE, Primary Examiner

J. H. SILBAUGH, Assistant Examiner

U.S. Cl. X.R.

264—210 R, 290 R; 425—326 B